Dec. 16, 1930.    J. L. OSBORNE    1,785,702

BEARING

Filed March 11, 1929

INVENTOR
John L. Osborne,
BY
Neil W. Preston,
ATTORNEY

Patented Dec. 16, 1930

1,785,702

UNITED STATES PATENT OFFICE

JOHN L. OSBORNE, OF ROCHESTER, NEW YORK, ASSIGNOR TO GENERAL RAILWAY SIGNAL COMPANY, OF ROCHESTER, NEW YORK

BEARING

Application filed March 11, 1929. Serial No. 346,236.

This invention relates in general to bearings for horizontal spindles, and has more particular reference to a combined knife edge and thrust bearing for spindles used in light signals, relays, and the like, such as are used in railway practice.

In spindle bearings for devices of this character used in railway operation, it is very necessary that such bearings be simple and rugged in construction so as to withstand a very large number of operations without undue wear. At the same time, in the interest of economy, the operating forces employed are generally rather small, and hence it is necessary, for certainty of operation, that such bearings be very accurately constructed and adjusted and practically frictionless.

With the above and other objects in view, it is proposed, in accordance with this invention, to provide a bearing for horizontally positioned spindles which combines the above desired features in a much more satisfactory manner than has heretofore been accomplished.

Further objects of this invention comprise decreasing the cost of production, increasing the efficiency, and prolonging the useful life, of devices of this character.

Further objects, purposes and characteristic features will appear as the description progresses, reference being made to the accompanying drawings showing, solely by way of example, and not in any manner in a limiting sense, one form which the invention can assume. In the drawings:—

Figure 1:
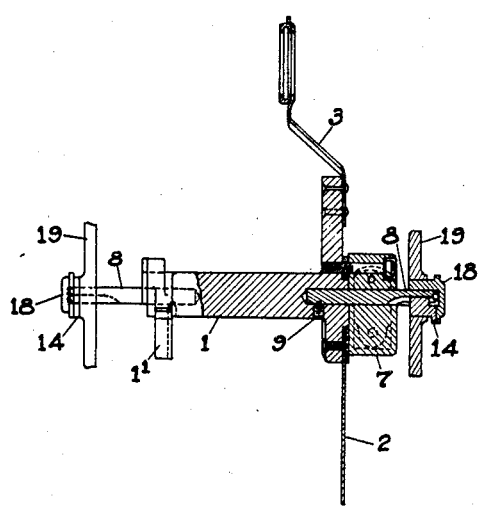
Fig. 1 is a side elevation, with parts shown in section, of the invention as applied to a light signal spindle.
Figure 2:
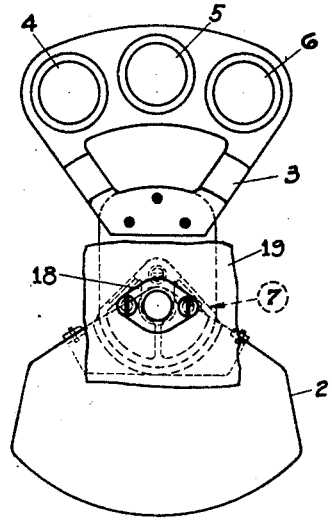
Fig. 2 is a front elevation of the spindle and associated parts.

Referring now to the drawings, a spindle 1 is shown carrying a counter-weight $1^1$, an operating vane 2 and a spectacle 3 equipped with different colored glasses 4, 5 and 6 for indicating in the usual manner proceed, stop and caution, and likewise carried by the spindle 1 is a shiftable counter-weight 7.

The operation of the vane 2 and spectacle 3 can be such, for example, as occurs in the patent to W. D. Hailes 1,617,247 granted February 8, 1927, the patent to Carter 1,667,469 granted April 24, 1928, and the applications of Merkel Ser. No. 132,835 and Field Ser. No. 128,437, respectively.

Carried by the spindle 1, are end pins 8 held in position by set screws 9. Each pin 8 has a groove 10 formed in the lower side thereof at its end, as by milling or otherwise extending through an arc of approximately 90° and extending to the center of the pin. The end of each pin 8 is formed with a circular socket 11 to receive a ball 12 constituting part of a thrust bearing for each end of the spindle 1.

Figure 3:
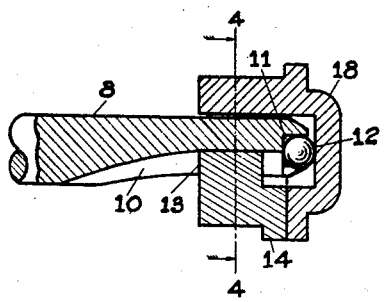
Fig. 3 is a side sectional elevation on line 3—3 of Fig. 4, viewed in the direction of the arrows.
Figure 4:
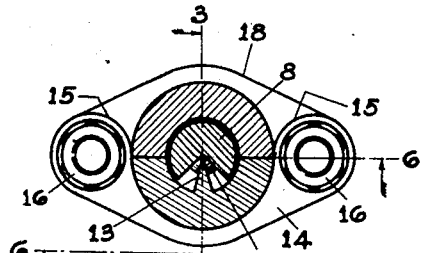
Fig. 4 is a sectional view, on lines 4—4 of Figs. 3 and 6, viewed in the direction of the arrows.
Figure 5:
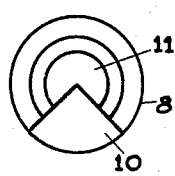
Fig. 5 is a front elevation of Fig. 3, with the bearing and casing parts removed.
Figure 6:
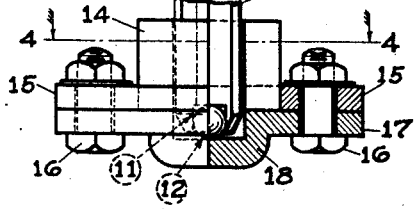
Fig. 6 is a sectional view on line 6—6 of Fig. 4, viewed in the direction of the arrows.

Received in the groove 10 is a knife member 13, as shown most clearly in Figs. 3 and 4, for supporting the spindle thereon in a pivotal manner. This knife member 13 is integral with a bracket 14 having ears 15 which are bored to receive connecting bolts 16 for securely bolting it to flanges 17 carried by a cup like member 18, against which the ball 12 bears. The entire bearing and receiving casing is for receiving the end of pin 8 and is received and supported by a fixed member such as a wall or the like 19 of a light signal or relay or like device.

From the above described construction it can be readily seen that the thrust bearing is constituted by the ball 12 held in the cup like socket 11 in the end of each pin 18 and retained in such socket by the outer end of the casing member 18.

The knife edge bearing, as likewise can be readily appreciated from the above description, permits a rocking movement of the spindle 1 in each direction from its normal biased position as shown, of some 30°, this amount of motion of course being readily variable by modifying the design of the bearing. The spindle 1 is carried by its end pins 8 each of which has a loose fit in its bearing casing 14, 18, so that it contacts merely at the knife edge 13 and the ball 12, thus making a practically frictionless bearing. At the same time the knife member 13 is of considerable length, as shown in Fig. 3, so as to constitute a strong and durable member capable of withstanding a large number of operations without undue wear.

The groove 10 for receiving the knife member 13 can, as stated above, be formed by a milling operation, or otherwise, and by extending it from some distance inwardly of the end of pin 8, to the end of the pin 8, the groove can be quickly and economically formed, decreasing in depth as it runs inwardly from the end of each pin 8.

The invention has been shown, and described above, in connection with a light signal, but can be used with equal advantage in relays and any other similar devices, its advantages being realized in connection with all horizontally pivoted spindles where accurate adjustment and operation and long life under a large number of operations, is required in connection with small operating forces.

The proportions of the various parts, as shown in the drawing and described above, can be varied within reasonable limits without departing from the spirit of this invention and applicant does not desire to be limited to the particular dimensions shown and described.

The above rather specific description of one form of applicant's invention has been given solely by way of example, and is not intended, in any manner whatsoever, in a limiting sense. Obviously, this invention can assume many different physical forms, and is susceptible of numerous modifications, and all such forms and modifications are desired to be included by this invention, as come within the scope of the appended claims.

Having described my invention, I now claim:—

1. In a spindle bearing for railway apparatus and the like, a spindle positioned to rock on a horizontal axis, a groove in the lower side of the spindle extending inwardly from the end of the spindle, a cup like socket in the end of the spindle intersecting said groove, a casing loosely receiving the end of the spindle, a knife edge support carried by the casing and received in said groove to support said spindle, and a ball in said cup and held therein by said casing.

2. In a spindle bearing, a spindle positioned to rock on a horizontal axis, a groove in the lower side of the spindle extending inwardly from the end of the spindle, a cup like socket in the end of the spindle intersecting said groove, a two part casing loosely receiving the end of the spindle, a knife edge support carried by one part of the casing and received in said groove to support said spindle, and a ball in said cup and held therein by the other part of said casing.

3. In a bearing for horizontal spindles, a spindle, a groove milled in the lower side of the spindle, extending from the end of the spindle to a point some distance inwardly thereof, and becoming shallower at one position as it extends inwardly of the end, a cup like socket in the spindle and intersecting said groove, a two part casing loosely receiving the end of the spindle, a knife edge support carried by one part of the casing and received in the outer end of said groove, and a ball in said socket and held therein by the other part of the casing.

4. In a bearing for horizontal spindles, a spindle, a groove milled in the lower side of the spindle, extending from the end of the spindle to a point some distance inwardly thereof, and becoming shallower as it extends inwardly of the end, a cup like socket in the spindle end intersecting said groove, a two part casing loosely receiving the end of the spindle, a knife edge support carried by one part of the casing and received in the outer end of said groove, and a ball in said socket and held therein by the other part of the casing, said groove including an arc of approximately 90° and deepening from the surface of the spindle at its inner end to the center of the spindle at its outer end.

5. In a bearing for horizontal spindles, a spindle, a groove milled in the lower side of the spindle, extending from the end of the spindle to a point some distance inwardly thereof, and becoming shallower as it extends inwardly of the end, a cup like socket in the spindle end intersecting said groove, a two part casing loosely receiving the end of the spindle, a knife edge support carried by one part of the casing and received in the outer end of said groove, and a ball in said socket and held therein by the other part of the casing, said groove including an arc substantially less than 180° whereby to prevent dropping of said ball, and deepening from the surface of the spindle at its inner end to the center of the spindle at its outer end.

In testimony whereof I affix my signature.

JOHN L. OSBORNE.